United States Patent
Messier

(10) Patent No.: US 7,798,558 B2
(45) Date of Patent: Sep. 21, 2010

(54) TRAILER FLOOR

(76) Inventor: Donat Messier, 1069, Route 133, C.P. 298, Philipsburg, Quebec (CA) J0J 1N0

(*) Notice: Subject to any disclaimer, the term of this patent is extended or adjusted under 35 U.S.C. 154(b) by 0 days.

(21) Appl. No.: 12/322,525

(22) Filed: Feb. 2, 2009

(65) Prior Publication Data
US 2009/0243335 A1 Oct. 1, 2009

(30) Foreign Application Priority Data
Mar. 27, 2008 (CA) .................................. 2627422

(51) Int. Cl.
*B62D 25/20* (2006.01)
(52) U.S. Cl. .................. 296/184.1; 296/193.07
(58) Field of Classification Search .......... 296/184.1, 296/182.1, 193.07
See application file for complete search history.

(56) References Cited

U.S. PATENT DOCUMENTS

| | | | | |
|---|---|---|---|---|
| 3,416,280 A * | 12/1968 | Young | ..................... | 52/579 |
| 4,938,524 A * | 7/1990 | Straub et al. | ............. | 296/184.1 |
| 5,242,185 A * | 9/1993 | Carr et al. | ................ | 280/423.1 |
| 5,322,314 A * | 6/1994 | Blum | ....................... | 280/423.1 |
| 5,791,714 A * | 8/1998 | Hall, Jr. | ................... | 296/24.31 |
| 6,174,023 B1* | 1/2001 | Booher | ..................... | 296/184.1 |
| 7,014,252 B2* | 3/2006 | Booher | ..................... | 296/182.1 |
| 7,264,305 B2* | 9/2007 | Kuriakose | ............. | 296/193.07 |
| 7,267,393 B2* | 9/2007 | Booher | ..................... | 296/182.1 |
| 7,378,000 B2* | 5/2008 | Lemmons | ................ | 296/186.1 |
| 7,390,053 B2* | 6/2008 | Booher | ..................... | 296/186.1 |
| 7,401,844 B2* | 7/2008 | Lemmons | ................ | 296/186.1 |
| 7,568,754 B2* | 8/2009 | Adams | .................... | 296/184.1 |
| 2002/0025237 A1* | 2/2002 | Adams | ....................... | 410/101 |
| 2008/0211218 A1* | 9/2008 | Booher | ........................ | 280/789 |
| 2008/0258500 A1* | 10/2008 | Booher | ..................... | 296/184.1 |
| 2009/0028658 A1* | 1/2009 | Adams | ....................... | 410/104 |

* cited by examiner

*Primary Examiner*—Jason S Morrow
(74) *Attorney, Agent, or Firm*—Eric Fincham

(57) ABSTRACT

A floor for a trailer, the floor comprising a plurality of cells, each of the cells having a top plate, a bottom plate, and a plurality of parallel vertical members extending between the top plate and bottom plate, the cells being welded to adjacent cells and to longitudinally extending beams. The structure permits the trailer to be relatively low compared to other known designs and provides for a more stable trailer in use.

12 Claims, 14 Drawing Sheets

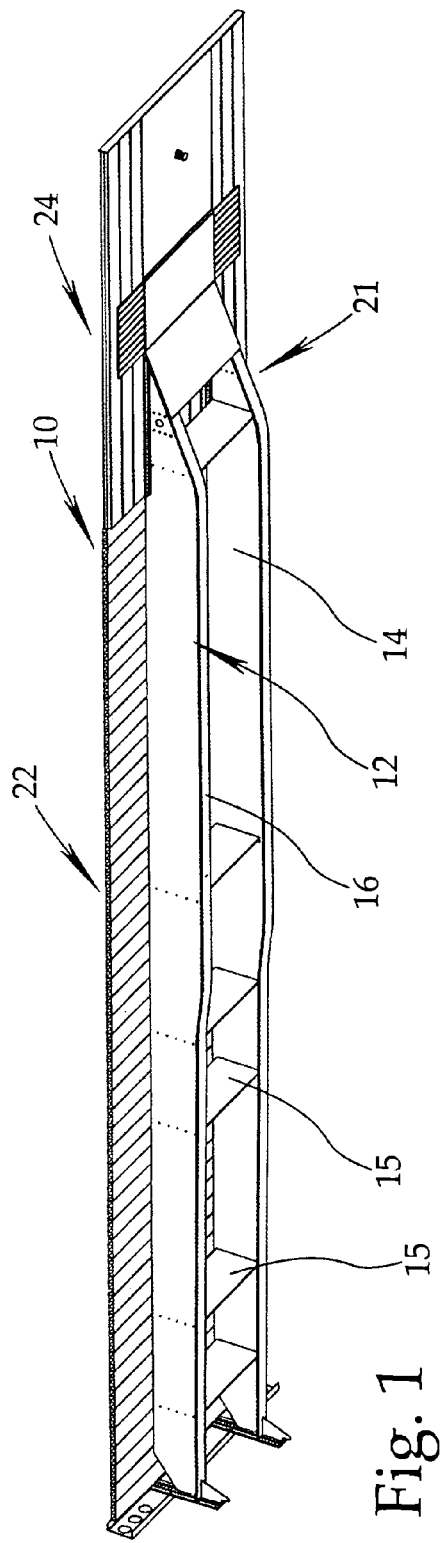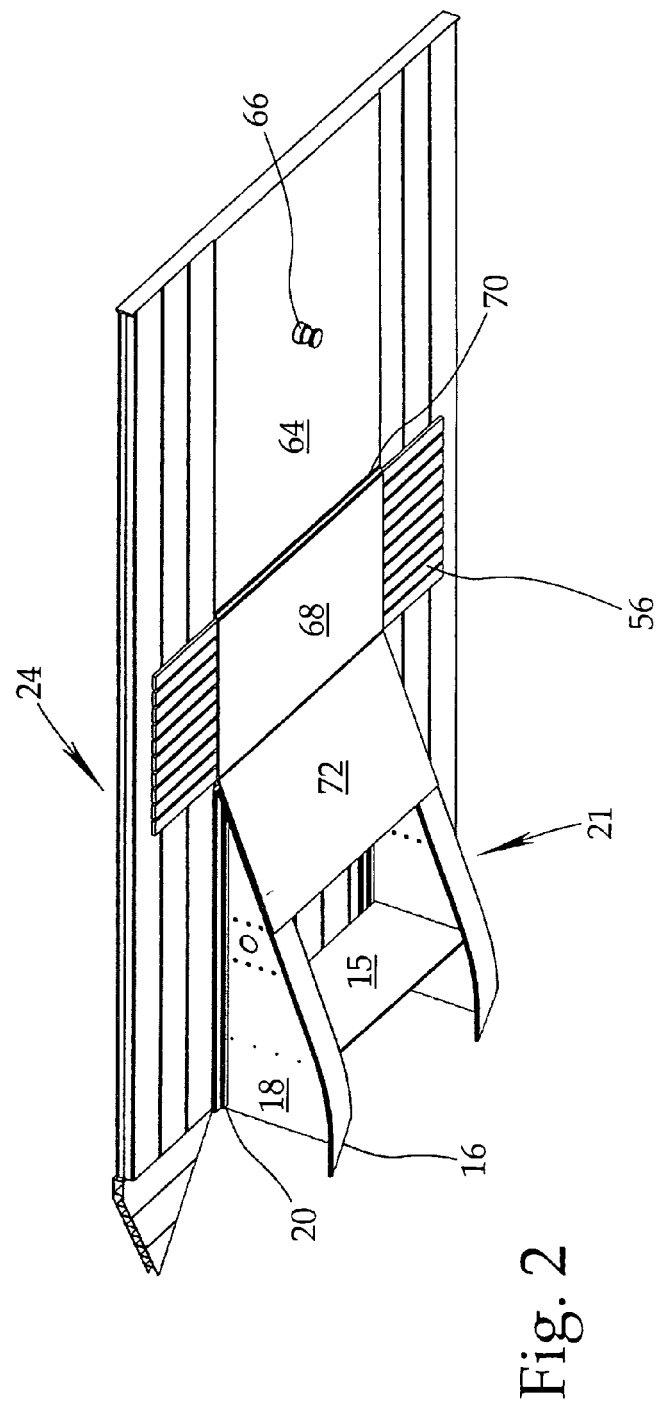
Fig. 1
Fig. 2

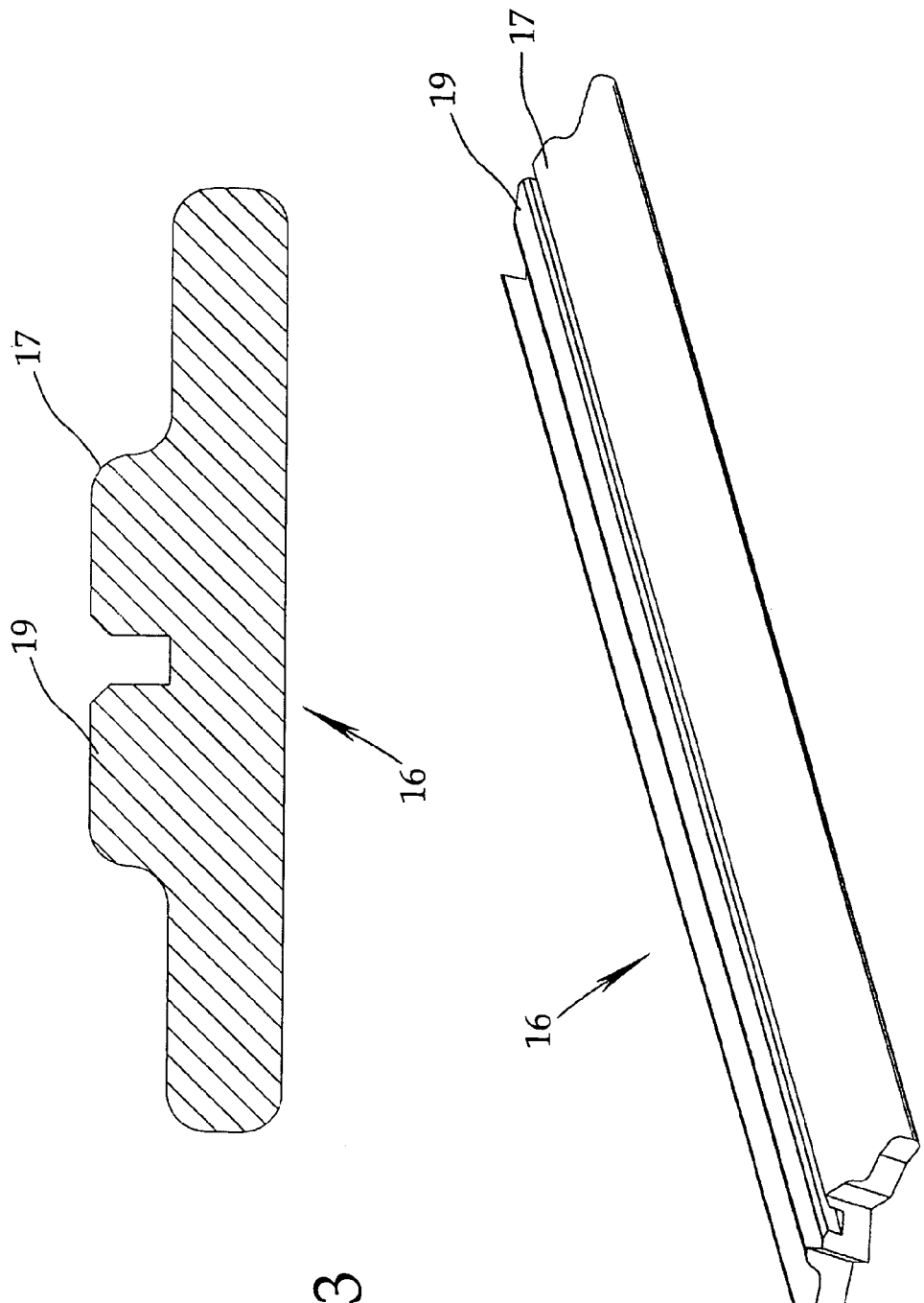

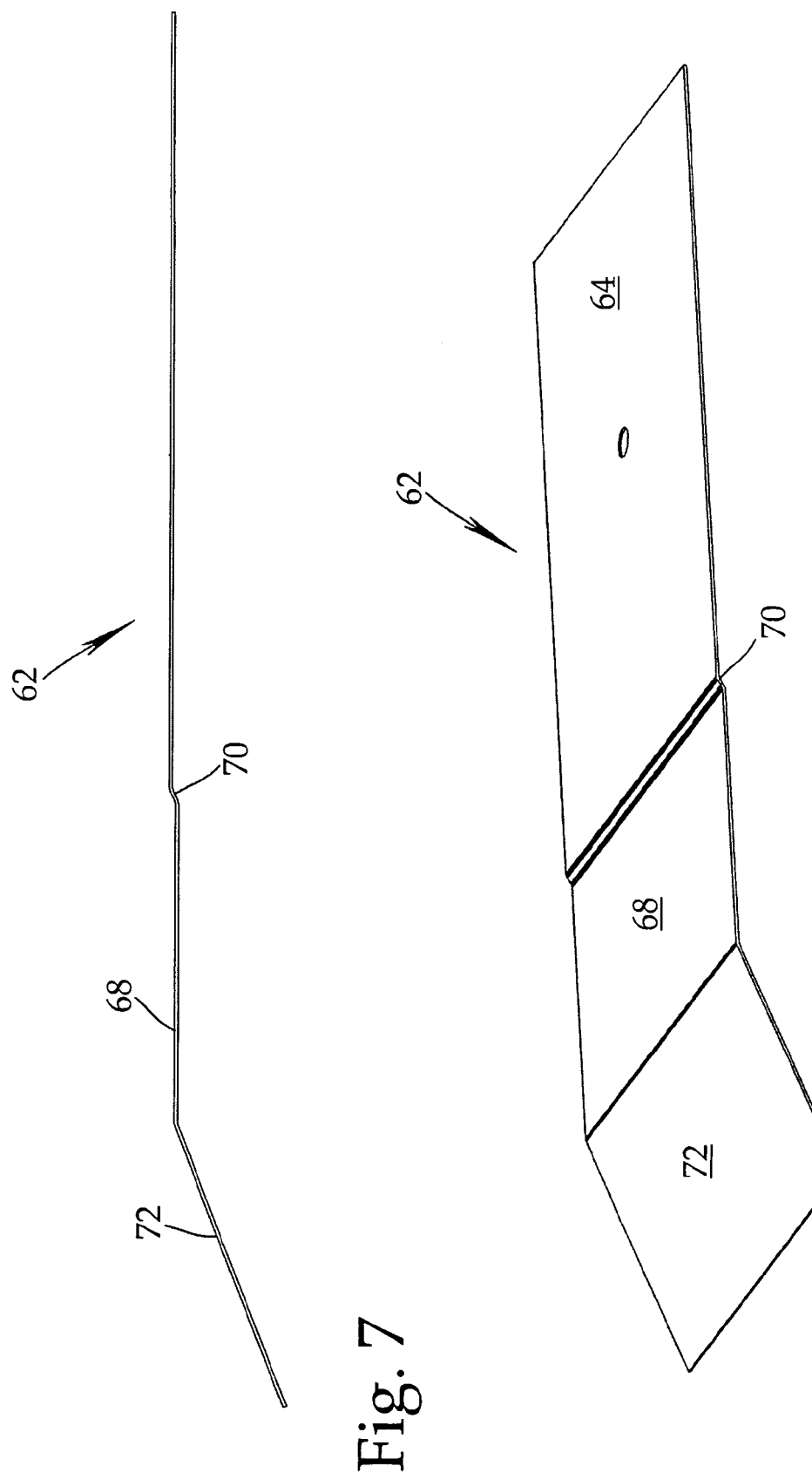

TRAILER FLOOR

FIELD OF THE INVENTION

The present invention relates to vehicles and more particularly, relates to flat bed trailers.

BACKGROUND OF THE INVENTION

Flat bed trailers are trailers which, in many instances, lack rigid or permanent side walls. Such trailers are particularly useful for larger and irregularly shaped goods which do not require complete protection from the elements. The trailers are also useful in the small yards where the trailer may be loaded or unloaded on either side thereof. Some of the trailers may have temporary protection by means of side walls which are fabricated out of a canvas or a canvas like material.

Generally, the trailers have a first load carrying portion which is at a lower height than a second load carrying portion which is located at the front (adjacent the cab) of the trailer. The raised portion is necessary to provide the structural integrity for the unit.

Naturally, the raised portion lessens the amount of space available for storage. Furthermore, it is at a height that is difficult for the driver to access.

As will be appreciated, it is also desirable to have all of the trailer at a relatively low height so that the driver can readily obtain access thereto. This also increases the load capacity since the main restriction is height which must take into account overpasses and the like. Generally, in North America, the maximum height allowed is standardized at approximately 13.5 feet.

SUMMARY OF THE INVENTION

It is an object of the present invention to provide a trailer structure which has a deck of reduced height and which provides an improved stability to the tractor trailer.

According to one aspect of the present invention, there is provided an improvement in a trailer having a pair of longitudinally extending beams and wherein the beams extend substantially the length of the trailer and are of a reduced height adjacent the front of the trailer, the improvement being wherein the floor has a front section and a rear section, the floor comprising a plurality of cells, each of the cells comprising a top plate, a bottom plate, a plurality of parallel vertical members extending between the top plate and the bottom plate, each of the cells being welded to adjacent cells, the parallel vertical members extending transversely of the floor in the rear section, the parallel vertical members extending longitudinally of the floor in the front section.

According to a further aspect of the present invention, there is also provided a trailer for hauling cargo, the trailer being designed to be connected to a tractor by means of a king pin, the trailer having a pair of I beams extending for a substantial portion of a length of the trailer, the I beams terminating short of the front of the trailer, a floor welded to the I beams, the floor comprising a plurality of cells, each of these cells comprising a top plate, a bottom plate, and a plurality of parallel vertical members extending between the top plate and the bottom plate, the cells being formed as cell modules, each of the cell modules being welded to adjacent modules.

The trailer floor of the present invention presents substantial advantages compared to known trailer floors. Thus, the use of the cells eliminates the need for cross members to provide support for the floor. This, in turn, permits the trailer to be relatively low compared to other known designs. Thus, the total height to the top plate of the floor can be as low as 43". This provides an arrangement which is inherently safer than designs having a higher floor. First of all, it permits the driver or other individual to easily gain access to the floor without the use of supplemental aids. Secondly, the relatively low height provides for a more stable trailer in use. Still further, the low height also permits the trailer to have a greater load carrying capacity. Still further, the trailer is of a relatively light weight compared to other known designs.

The trailer floor may be formed of any suitable material having the strength characteristics required. A preferred material would be an aluminum extrusion as will be discussed in greater detail hereinbelow.

As aforementioned, the floor of the present invention has two sections or portions. The rear portion constitutes the largest portion and utilizes two I beam structures which extend the longitudinal length thereof. The I beam structures are not conventional as will be described in the illustrated embodiment. The floor of this rear portion or section comprises a plurality of cells with each of the cells comprising a top plate, a bottom plate, a plurality of parallel vertical members which extend between the top plate and the bottom plate to thereby form the cells. The parallel vertical members extend transversely to the longitudinal direction of the beams. The cells are preferably formed (typically by extrusion) in a module of a minimum of three cells. These cell modules can then be secured to like modules by any suitable means.

At the forward or front portion of the trailer, in a transition zone or area, the I beams taper to reduce their depth.

The flooring in the transition zone section wherein the beams are of diminishing depth and also the front of the trailer is formed of cells as previously described to comprise a top plate, a bottom plate, a plurality of vertical members extending between the top plate and the bottom plate. However, in this portion or section of the floor, the parallel vertical members run parallel to the longitudinal direction of the trailer and beams. The cells are again preferably formed in modules with the modules being welded together.

To provide for reinforcement for this section, a plurality of flat bars which are preferably spaced apart may extend in a transverse direction and are welded to the longitudinally extending cells. Preferably, these flat bars commence at a point where the beams have completely ceased to exist.

In addition to the above, a reinforcing metal plate may extend from the front of the trailer over the flat bars, and onto a sloped portion of the beams. Again, the metal is welded as required.

Although different sizes may be utilized, each of the cells in the front and transition zones is preferably formed such that the top plate and bottom plate have a thickness of between ⅛ inch and ½ inch. The cells also preferably have a width of between two and three inches.

BRIEF DESCRIPTION OF THE DRAWINGS

Having thus generally described the invention, reference will be made to the accompanying drawings illustrating an embodiment thereof, in which:

FIG. 1 is a perspective view, partially in section, of a trailer according to the present invention;

FIG. 2 is a detailed view of the transition section;

FIG. 3 is a cross-sectional view of a portion of an I beam structure;

FIG. 4 is a perspective view of a portion of an I beam structure;

FIG. 7 is a side elevational view of a reinforcing plate used in the front and transition section;

FIG. 8 is a perspective view thereof;

DETAILED DESCRIPTION OF THE INVENTION

Figure 5:
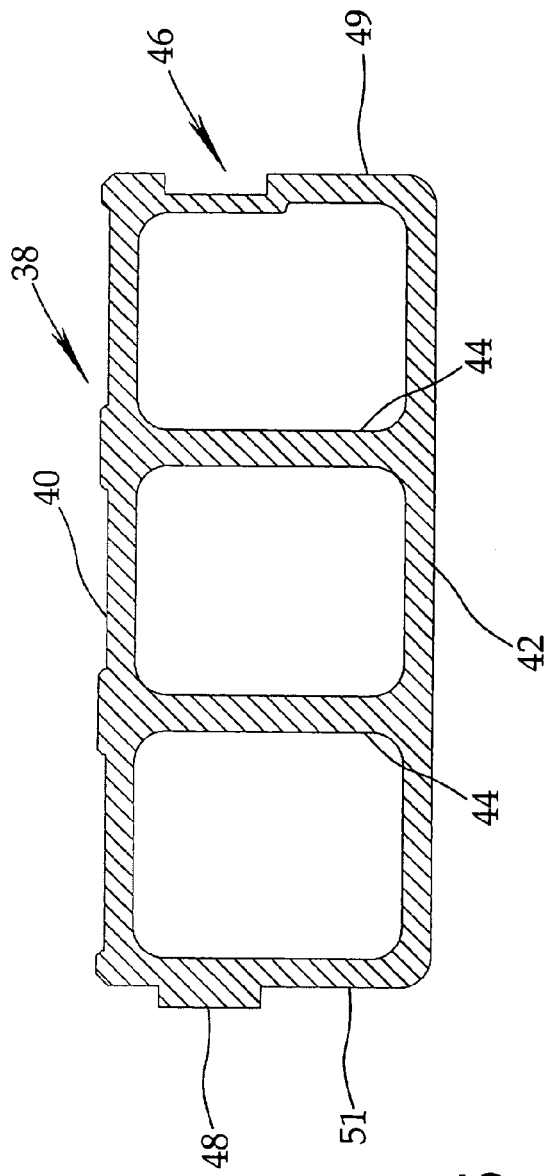
FIG. 5 is a cross-sectional view of a cell structure.

Referring to the drawings in greater detail and by reference characters thereto, there is illustrated in FIG. 1 a trailer body and which trailer body is generally designated by reference numeral 10. For purposes of clarity, the wheels and associated structure such as the axles are not shown. However, it will be understood that the trailer body would be mounted on a suitable structure.

Trailer body 10 includes a pair of I beam structures 12 and 14 which are substantially identical and hence only I beam 12 will be described in detail herein. Transverse connecting members 15 extend between I beam structures 12 and 14. I beam structure 12 includes a bottom flange portion 16, a top flange portion 20, and a web 18 extending therebetween.

The bottom flange portion 16 is illustrated in FIG. 3 and as may be noted, has a pair of protrusions 17 and 19 which are designed to receive therebetween web 18.

Figure 14:
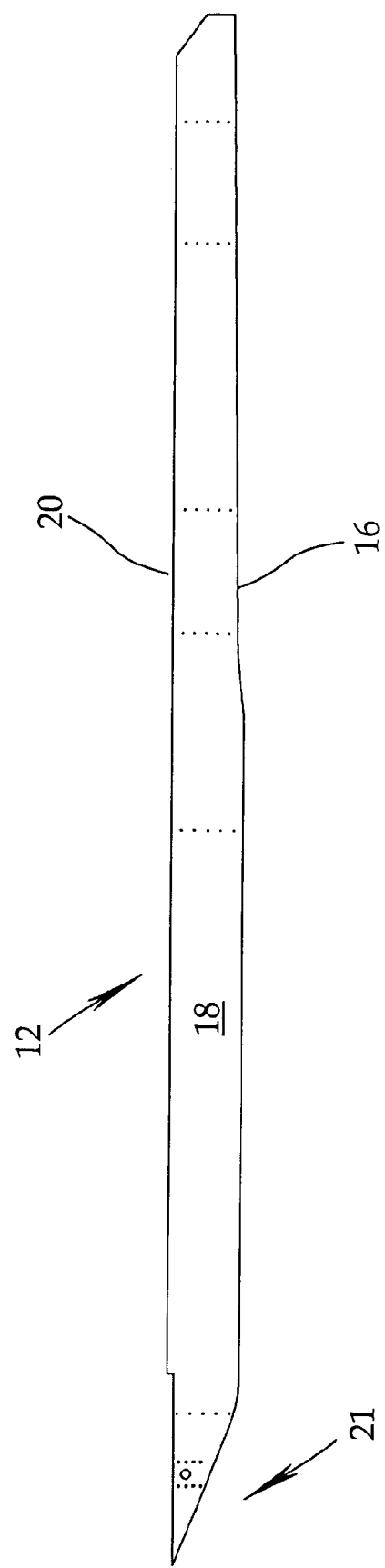
FIG. 14 is a side view of an I beam structure.

As may be seen from FIG. 14, I beam structures 12 and 14 extend for substantially their full depth for a length of the trailer. However, at the front end of the trailer, the depth of web 18 diminishes in what may be referred to as a transition section which is generally designated by reference numeral 21. At the front end of the trailer, there is no I beam structure present.

The floor has a rear portion generally designated by reference numeral 22 and a front portion generally designated by reference numeral 24. It will be noted that the front portion 24 starts at the transition section 21.

Figure 10:
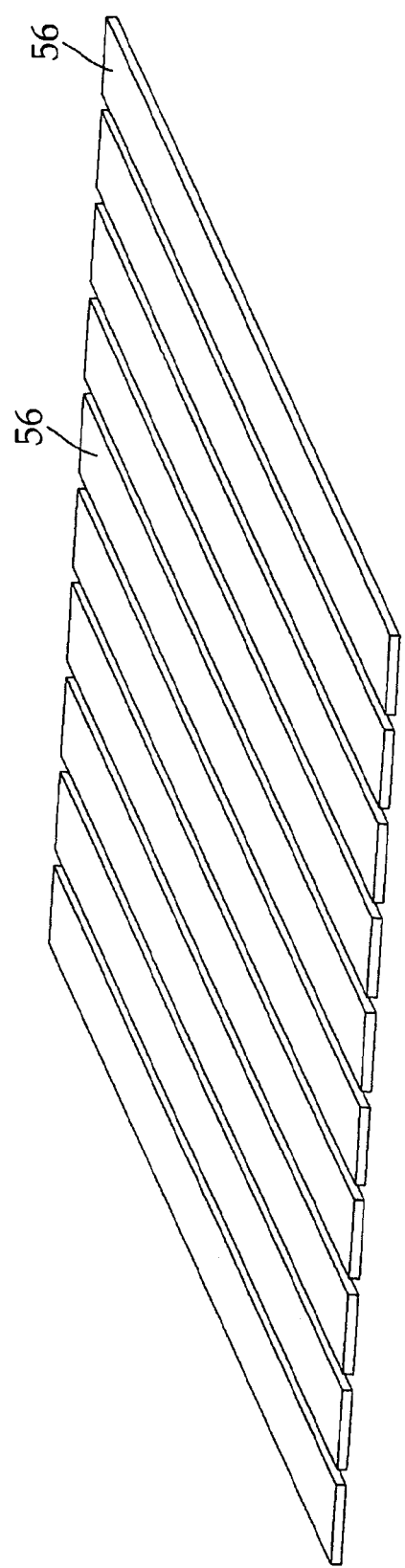
FIG. 10 is a perspective view thereof.

A portion of the floor structure is illustrated in FIG. 10 and reference will now be had thereto. As illustrated, the floor is comprised of a plurality of cell modules 26 each comprising three cells. There is provided a top plate 28, a bottom plate 30 and vertical members 32. Side walls 39 and 41 complete the structure. In side wall 39, there is provided a recess 34 while in side wall 41, a projection 36 is provided. Thus, projection 36 will seat within a corresponding recess 34 of an adjacent module and adjacent modules are welded together.

Figure 6:
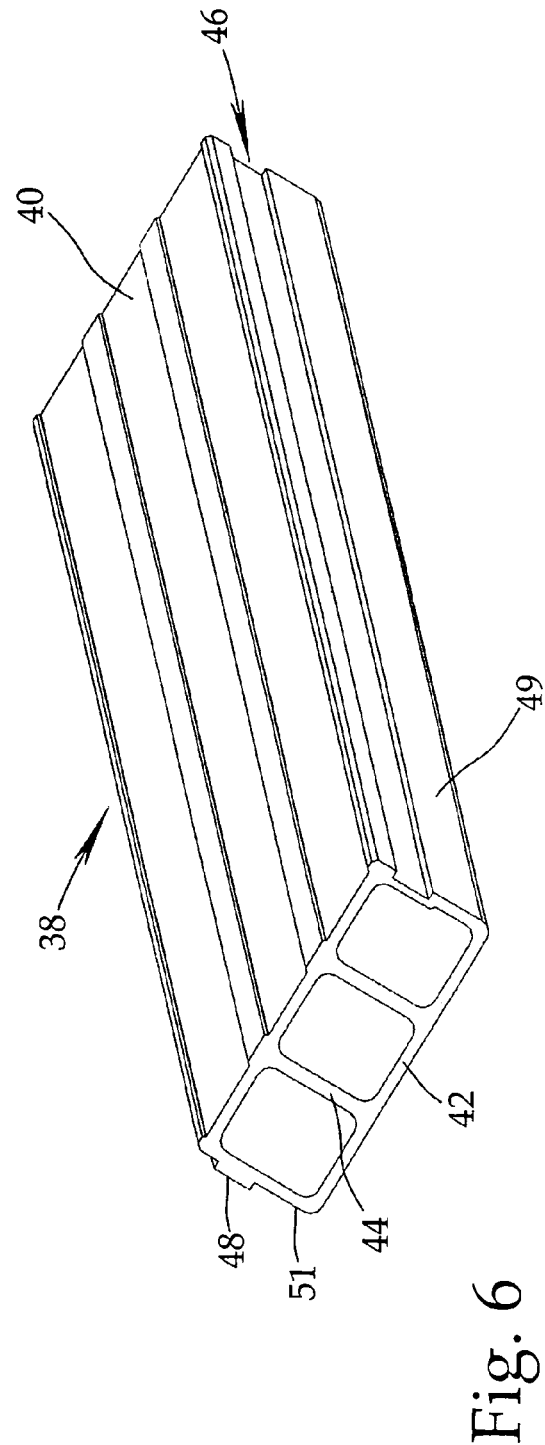
FIG. 6 is a perspective view of a cell structure.

The front portion 24 of the floor is also comprised of a plurality of cells; the structure is set forth in greater detail in FIGS. 5 and 6. As shown therein, the cell module 38 includes a top plate 40, a bottom plate 42 and vertical members 44. Side walls 49 and 51 complete the structure with a recess 46 being provided in side wall 49 and a projection 48 formed on side wall 51. As to was the case previously, projections 48 are designed to mate with an adjacent recess 46 and again, adjacent modules are welded together.

Figure 11:
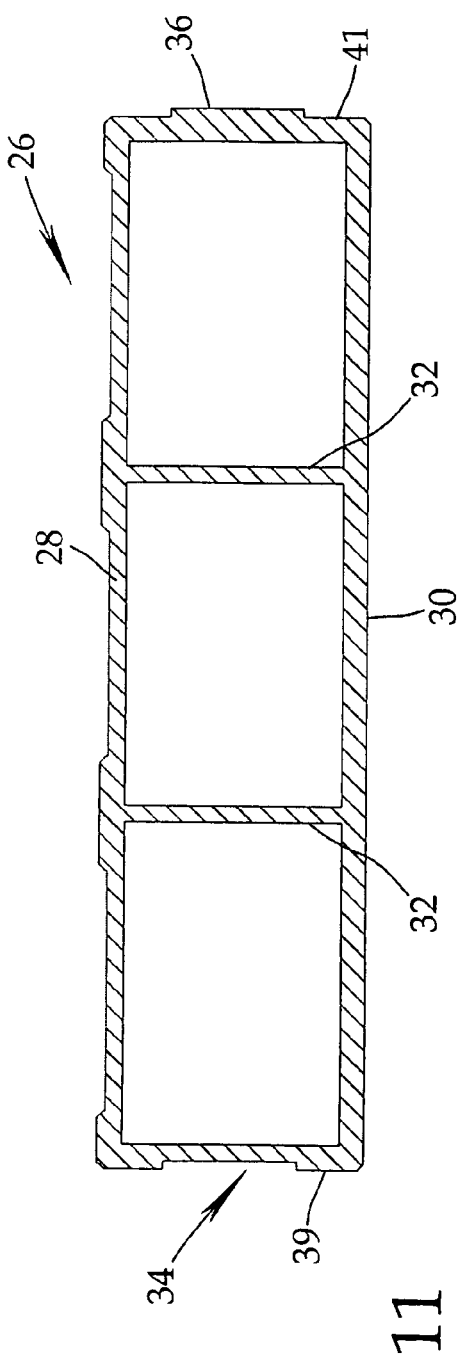
FIG. 11 is a cross-sectional view of the cell structure utilized in the rear portion.
Figure 12:
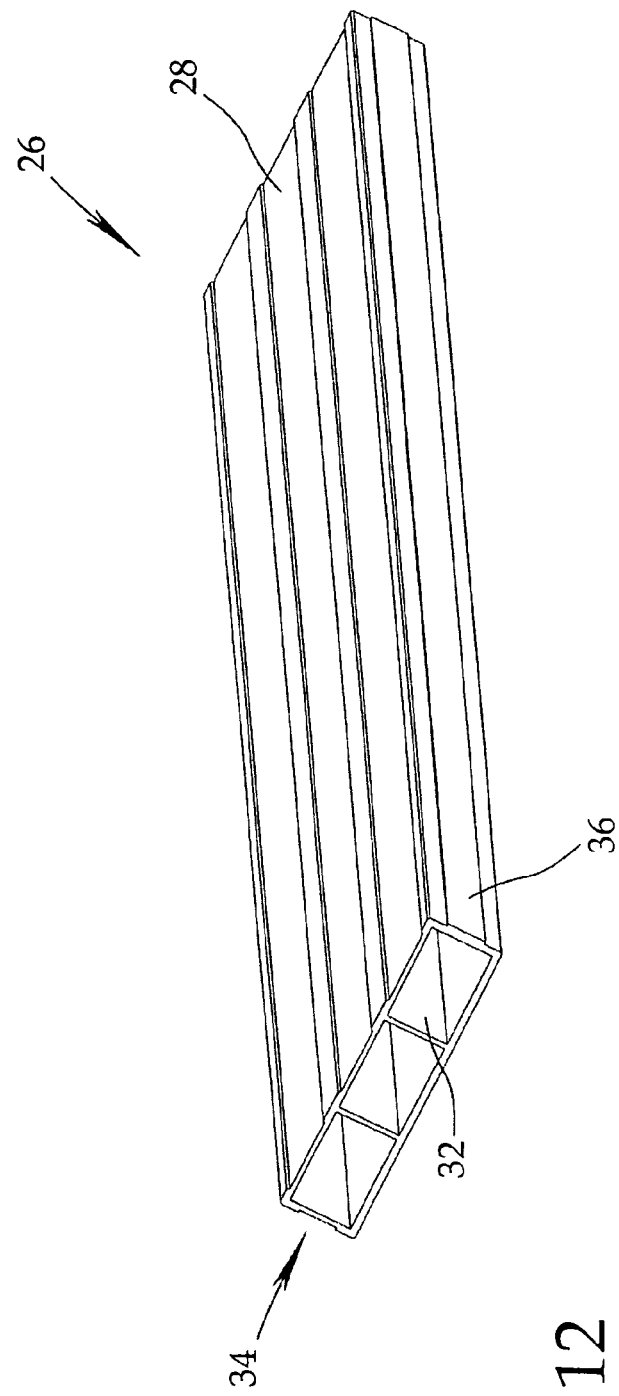
FIG. 12 is a perspective view thereof.
Figure 13:
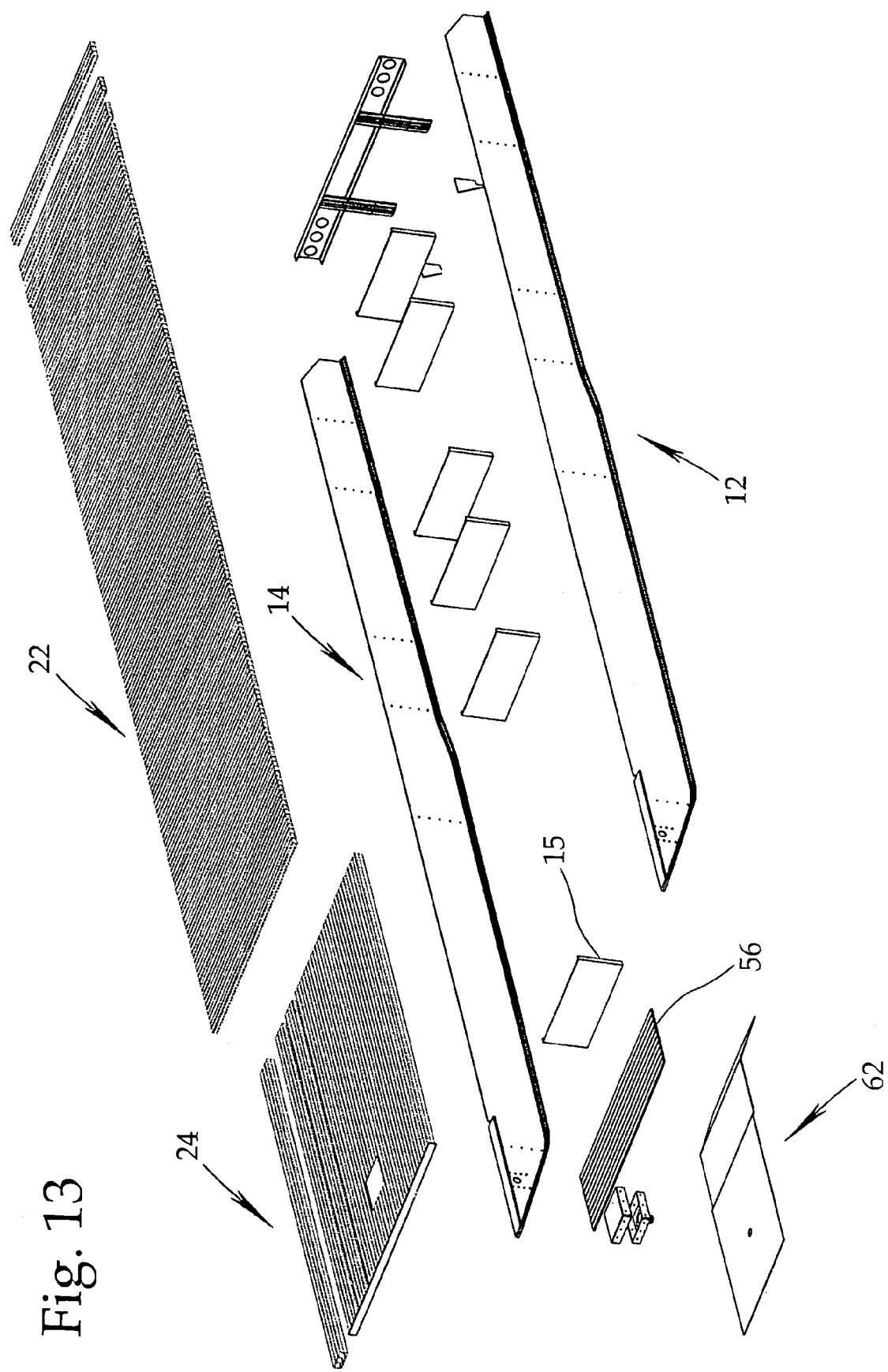
FIG. 13 is an exploded view of the trailer structure.

As will be noted, the shape of the two cell structures 26 and 38 are somewhat different. Thus, the structure shown in FIGS. 11 and 12 is used for the rear portion 22 of the floor and generally are formed with both the top plate and the bottom plate preferably having a thickness of between ⅛ and ½ inch and wherein each of the individual cells has a width of between 2 and 3 inches. The height of each cell would be in the area of 1 to 3 inches with a preferred height of approximately 2 inches.

Cell structure 38, on the other hand, will have a thicker top plate and bottom plate and preferably each plate 40, 42 having a thickness of between ¼ and ½ inch and more preferably between 3/16 and 5/16 inch. The overall height would be in the range of 2½ to 4 inches with a preferred range being between 3 and 3½ inches.

Figure 9:
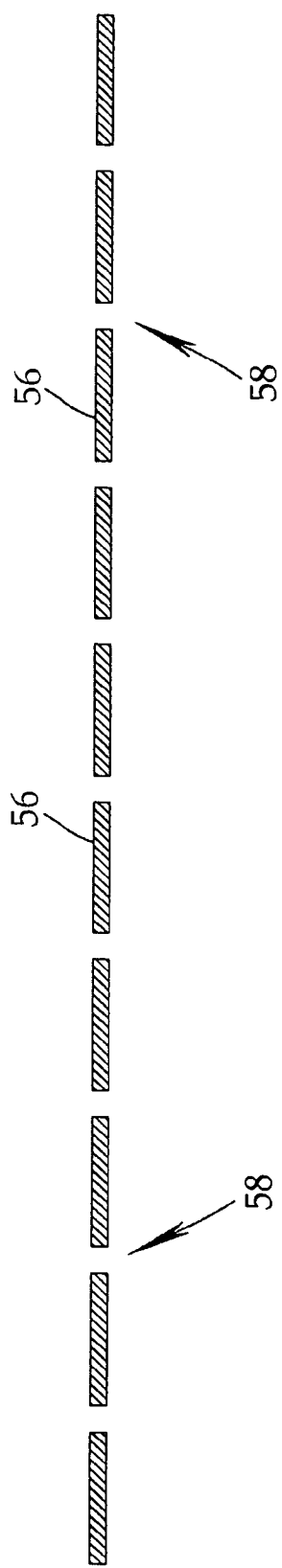
FIG. 9 is a cross-sectional of the reinforcing bars utilized at the portion of the trailer immediately following the transition section.

As may be seen in FIG. 2, at the end of transition section 21, there are provided a plurality of flat bars (FIGS. 8 and 9) 56, flat bars 56 being spaced from each other by a space 58.

At the front of the structure of the trailer body 10, there is provided a metal plate generally designated by reference numeral 62 and which has a front portion 64 extending only partially the width of the trailer floor. Metal plate front section 64 is designed to accept a king pin 66. Metal plate 62 also includes a metal plate central section 68 over flat bar 56. An offset 70 is provided to account for the thickness difference of flat bars 56. Finally, there is provided a metal plate rear section 72 which extends onto bottom flange 16 for a portion of the transition section 21.

Turning to the embodiment of FIGS. 15 to 21, similar reference numerals in the 100's are used to describe components similar to the embodiment of FIGS. 1 to 14.

As shown in FIG. 1, there is provided a trailer body which is generally designated by reference numeral 110 and as in the previous embodiment, the wheels and associated structure are not shown.

Trailer body 110 includes a pair of I beam structures 112 and 114 which are substantially identical. As in the previously described embodiment, there are provided transverse connecting members 115 which extend between I beam structures 112 and 114. I beam structure 112 includes a bottom flange portion 116, a top flange portion 120, and a web 118 extending therebetween.

Figure 15:
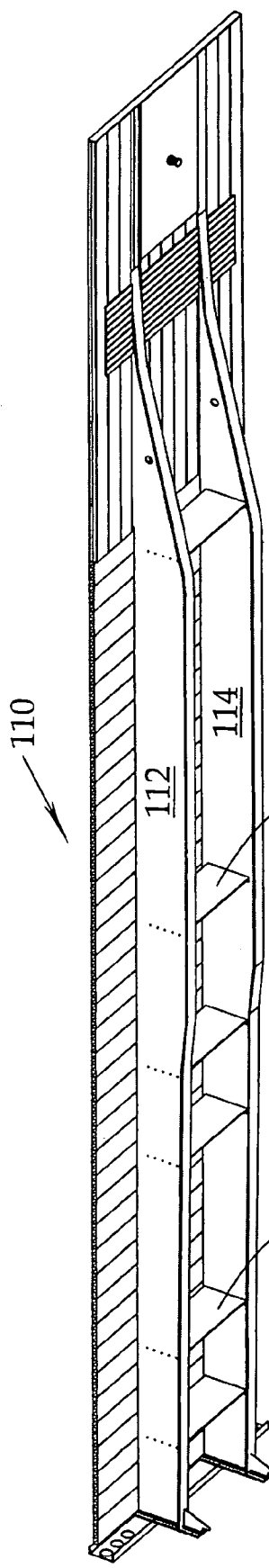
FIG. 15 is a perspective view of a further embodiment of a trailer according to the present invention.
Figure 16:
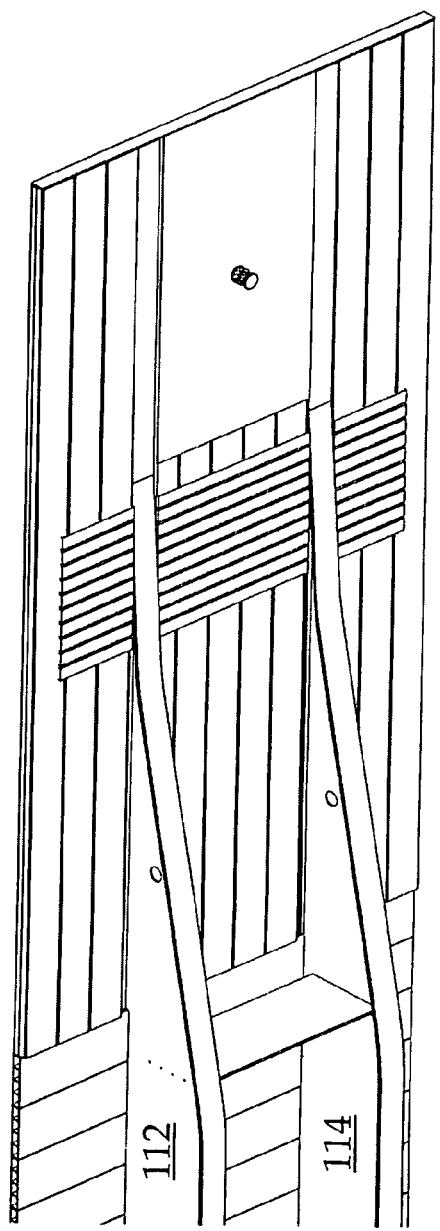
FIG. 16 is a detailed view of the transition section.
Figure 17:
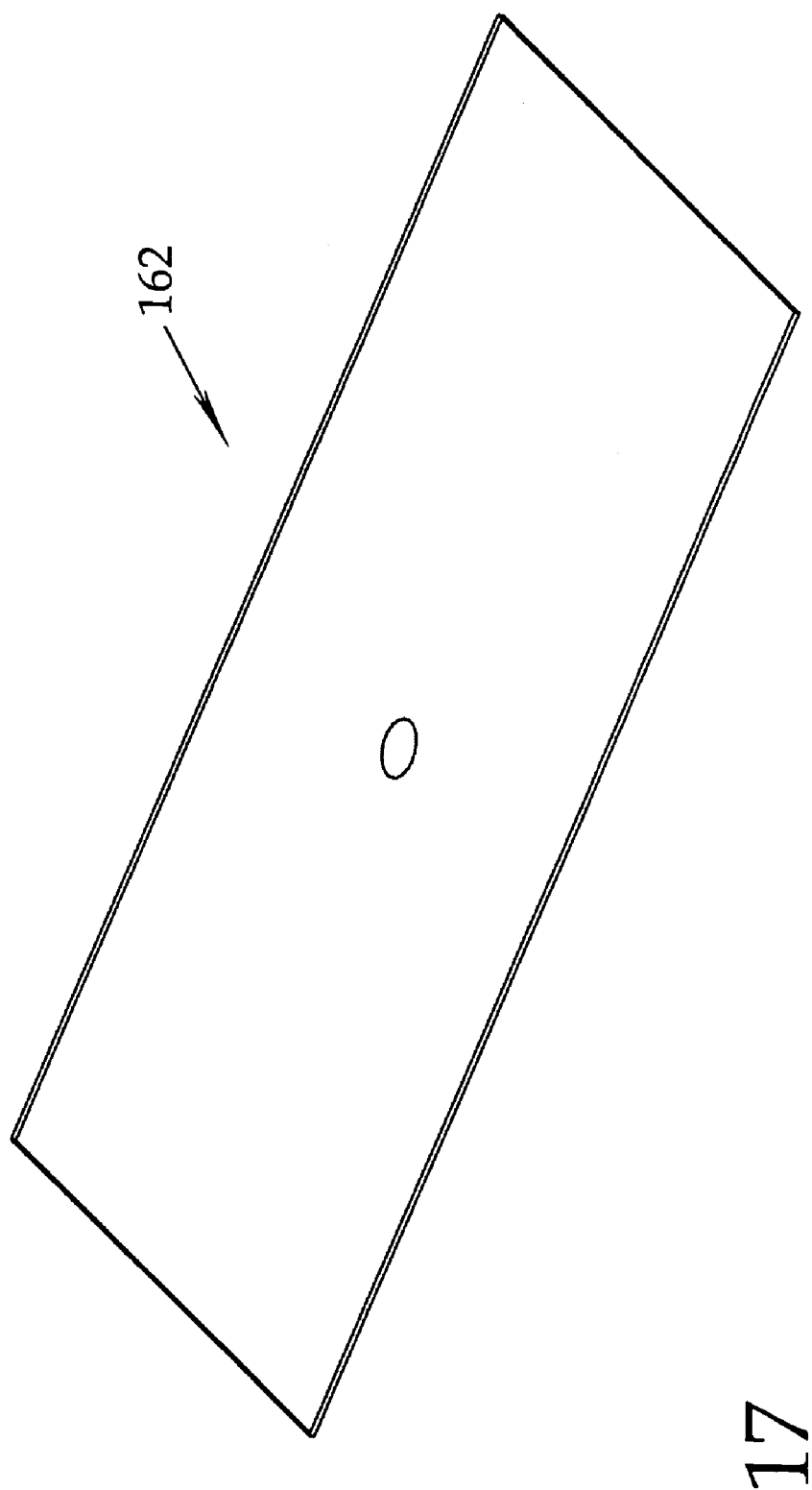
FIG. 17 is a perspective view of a reinforcing plate used in the front and transition section.
Figure 18:
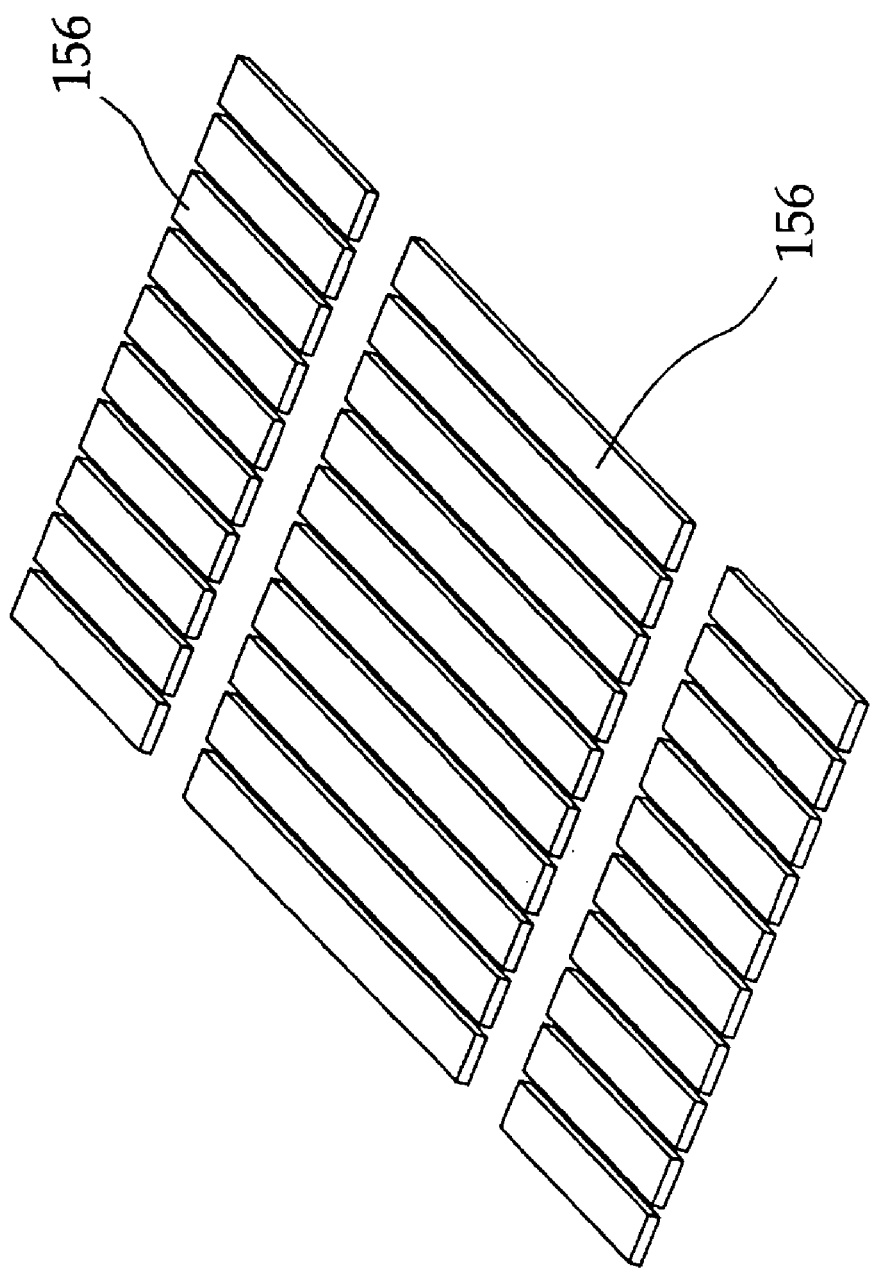
FIG. 18 is perspective view of the reinforcing bars utilized at the front portion of the trailer immediately preceding the transition section.
Figure 21:
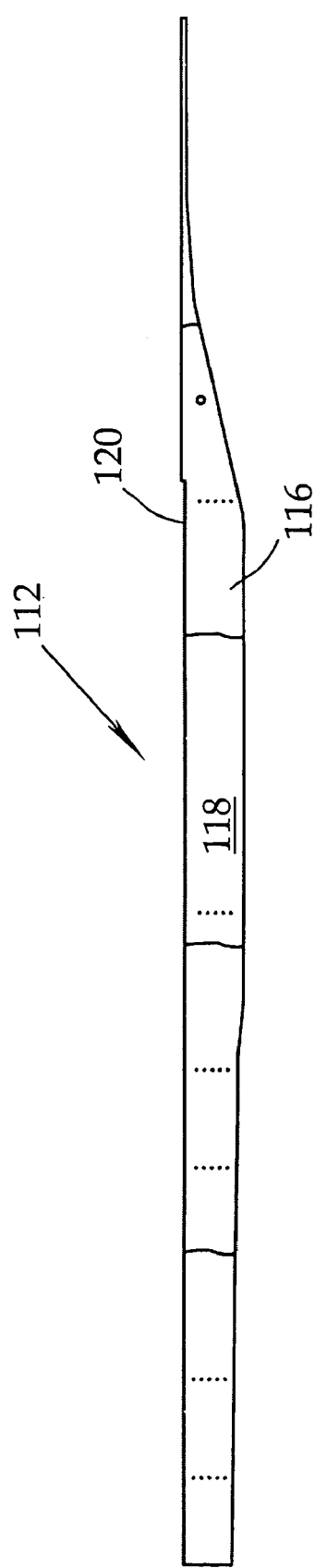
FIG. 21 is a side view of an I beam structure.

As may be seen in FIGS. 21, 15 and 16, I beam structures 112 and 114 continue for the length of the trailer. The depth of web 118 diminishes in the transition section; however, the I beam structure continues forward as a single piece of material. As seen in profile in FIG. 21, I beam 112 has a slightly different configuration at both the front and the rear. Thus, at the rear (left side of FIG. 21), web 118 has a slightly narrower depth compared to the middle section. At the front end, top flange portion 116 extends to the front of the trailer.

Figure 19:
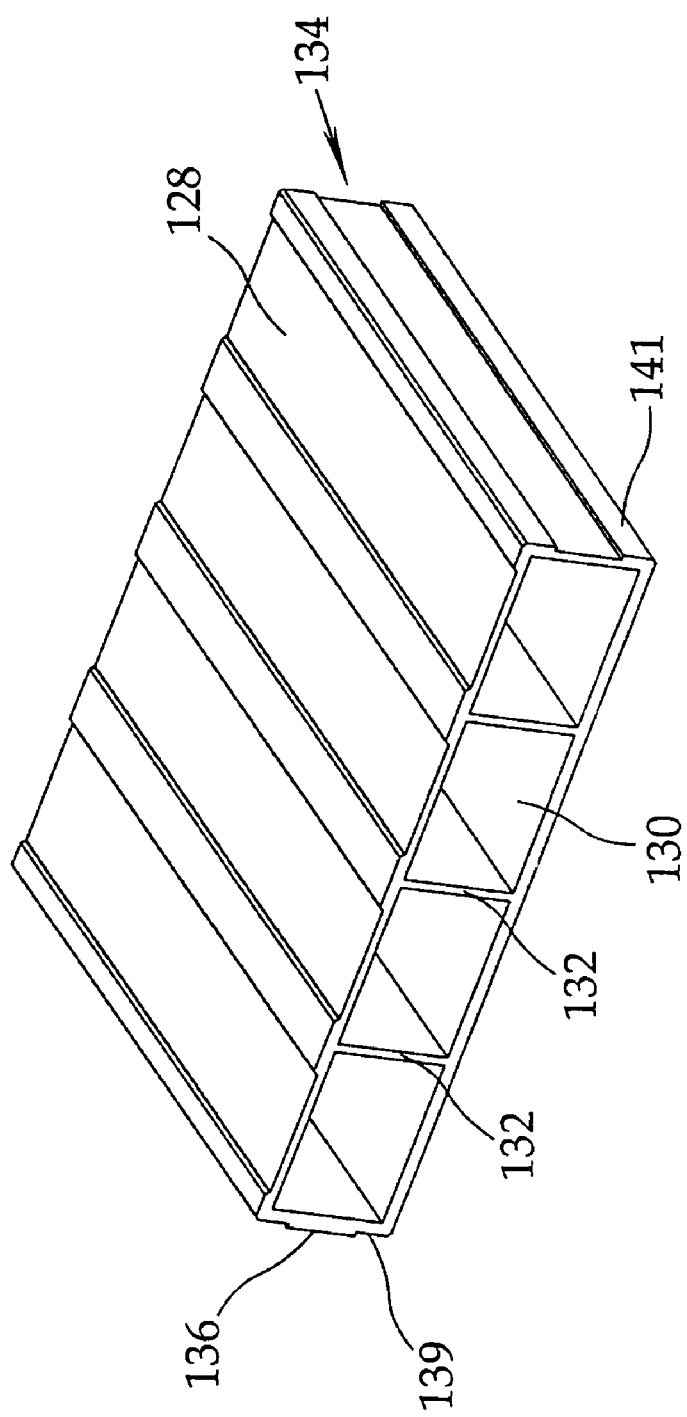
FIG. 19 is a perspective view of the cell structure utilized in the rear portion.
Figure 20:
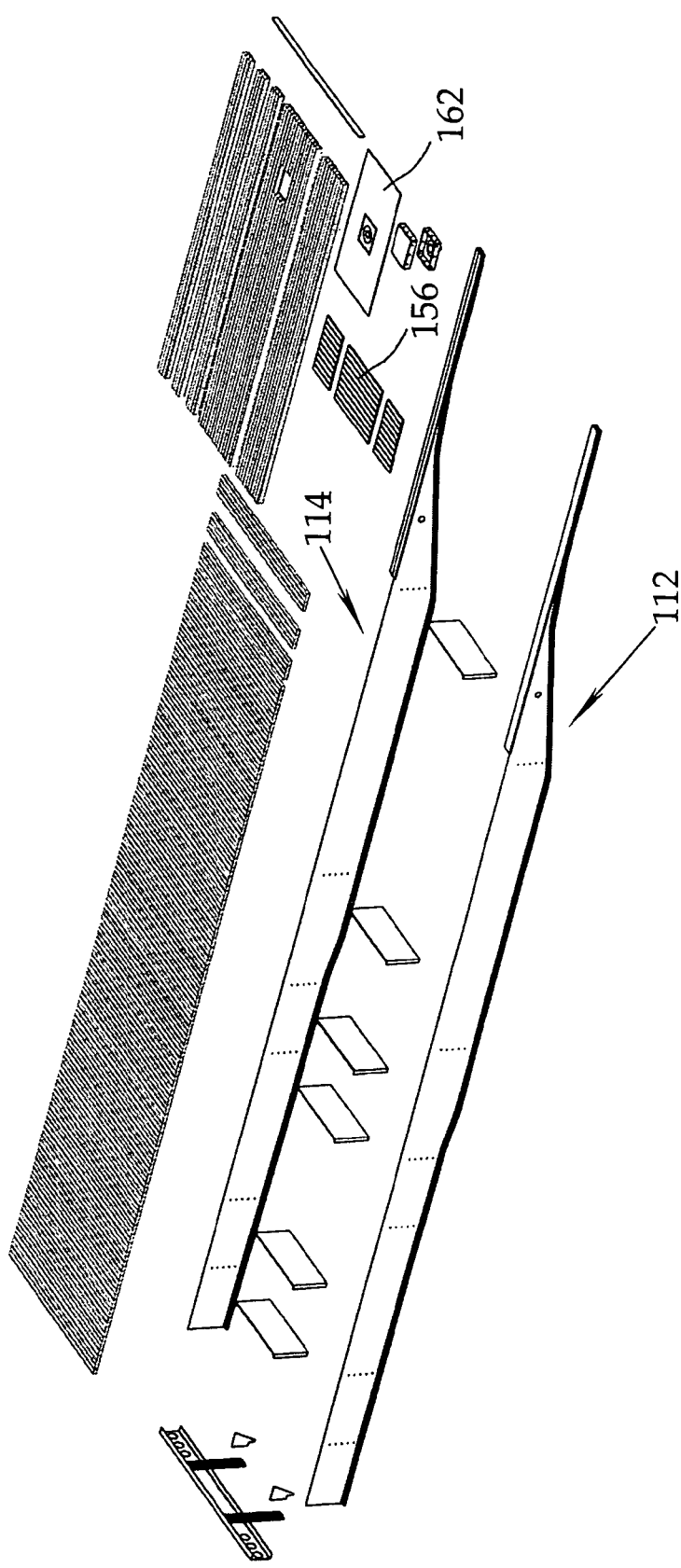
FIG. 20 is an exploded view of the trailer structure.

A portion of the floor structure is illustrated in FIG. 19, and it will be noted that the floor is comprised of a plurality of cell modules each comprising four cells. Thus, there is provided a top plate 128, a bottom plate 130, vertical members 132, and side walls 139 and 141. In side wall 141, there is provided a recess 134 while on side wall 139, a projection 136 is provided.

At the front of the trailer body, there is provided a metal plate generally designated by reference numeral 162 and which is substantially flat and rectangular.

It will be understood that the above described embodiments are for purposes of illustration only and that changes and modifications may be made thereto without departing from the spirit and scope of the invention.

I claim:

1. In a trailer having a pair of longitudinally extending beams and wherein the beams extend substantially the length of the trailer and are of a reduced height adjacent the front of the trailer; the improvement wherein the floor has a front section and a rear section, said floor comprising:
a plurality of cells, each of said cells comprising a top plate, a bottom plate, a plurality of parallel vertical members extending between said top plate and said bottom plate, each of said cells being welded to adjacent cells, said parallel vertical members extending transversely of said floor in said rear section, said parallel vertical members extending longitudinally of said floor in said front section.

2. The floor of claim 1 wherein said top plate, said bottom plate and said parallel vertical members are formed of an aluminum material.

3. The floor of claim 2 wherein said top plate and said bottom plate of said cells in said rear section have a thickness of between 1/8" and 1/2".

4. The floor of claim 3 wherein each of said cells in said rear section has a width of between 2" and 3".

5. The floor of claim 1 wherein said front section extends from a front of the trailer to a point proximate where said beams start being of a reduced height.

6. The floor of claim 3 wherein said top plate and said bottom plate of said cells in said front section have a thickness of between 3/16" and 5/16".

7. The floor of claim 4 wherein each of said cells has a height of between 3" and 3½".

8. The floor of the claim 1 wherein said beams extend the length of the trailer, a top surface of said beams forming an upper surface of said floor adjacent said front of the trailer.

9. A trailer for hauling cargo, said trailer being designed to be connected to a tractor by means of a king pin, said trailer having a pair of I beams extending for a substantial portion of a length of the trailer, said I beams terminating short of the front of the trailer, a floor welded to said I beams, said floor comprising a plurality of cells, each of these cells comprising a top plate, a bottom plate, and a plurality of parallel vertical members extending between said top plate and said bottom plate, said cells being formed as cell modules, each of said cell modules being welded to adjacent modules, said parallel vertical members of said cells extending transversely of the trailer for a substantial length of said floor, said parallel vertical members of said cells extending parallel to a longitudinal axis of said trailer at a front portion of said trailer.

10. The trailer of claim 9 wherein said top plate, said bottom plate and said vertical members are formed of an aluminum material.

11. The trailer of the claim 9 wherein said beams extend the length of the trailer, a top surface of said beams forming an upper surface of said floor adjacent said front of the trailer.

12. The trailer of claim 9 further including a plurality of transversely extending bars under said parallel vertical members of said cells extending parallel to the longitudinal axis of said trailer.

\* \* \* \* \*